April 21, 1936.   R. F. GIBBS   2,038,278
MANUFACTURE OF METAL STOCK
Filed Oct. 25, 1934    2 Sheets-Sheet 1
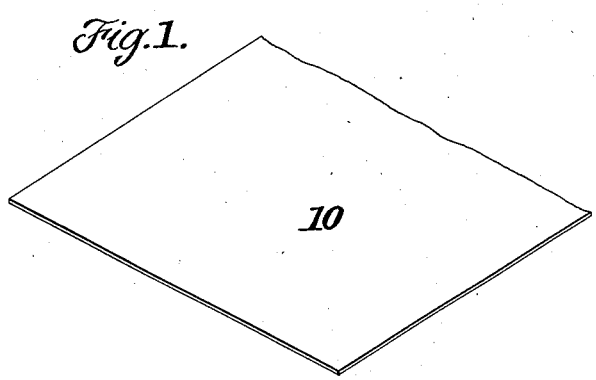
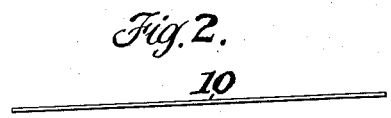
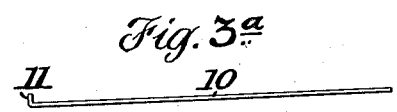
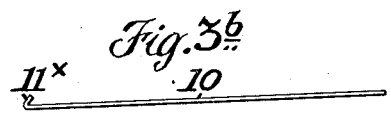
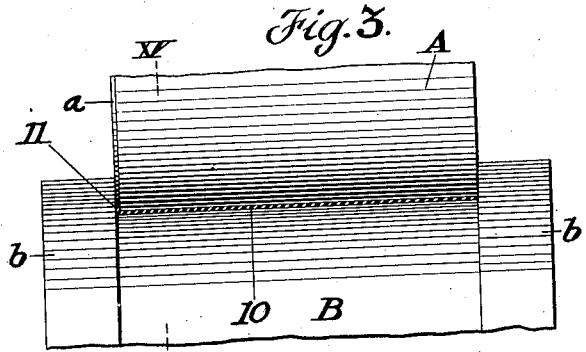
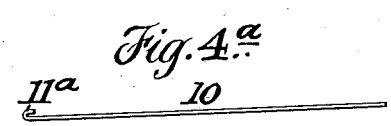
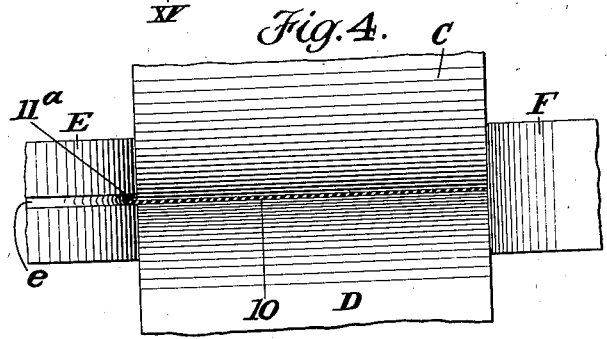
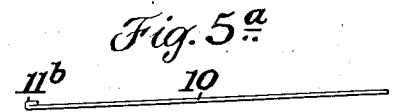
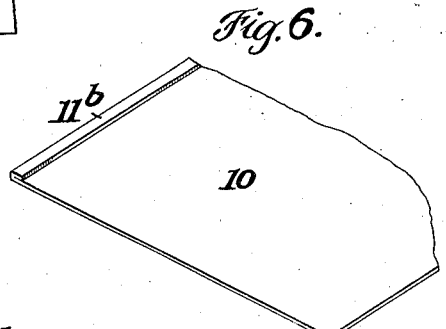
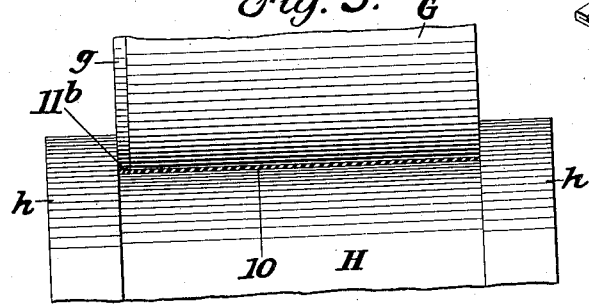
INVENTOR
Ralph F. Gibbs,
BY
Horatio E. Bellows
ATTORNEY April 21, 1936. R. F. GIBBS 2,038,278
MANUFACTURE OF METAL STOCK
Filed Oct. 25, 1934 2 Sheets-Sheet 2
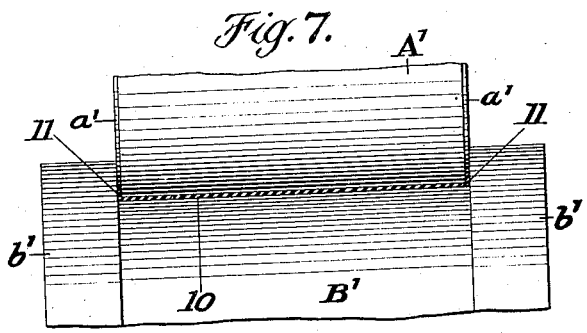
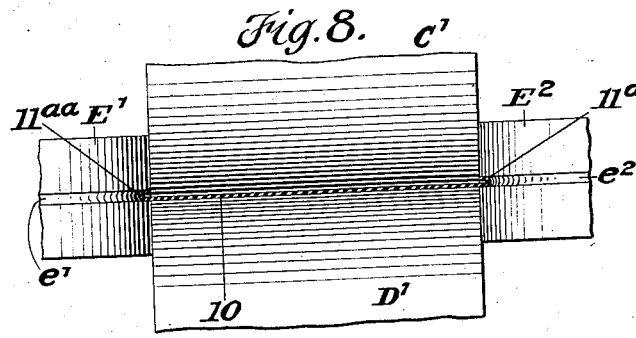
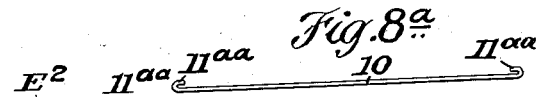
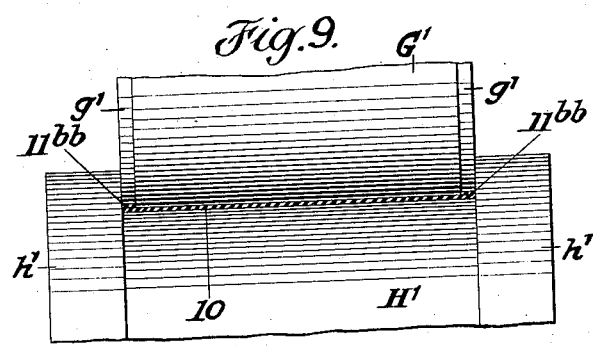
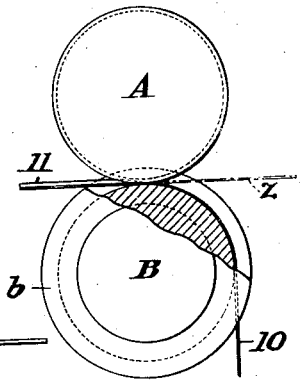
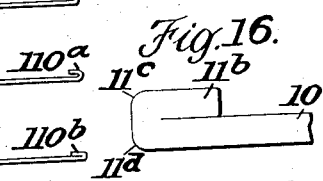
INVENTOR
Ralph F. Gibbs,
BY Horatio E. Bellows
ATTORNEY Patented Apr. 21, 1936

2,038,278

UNITED STATES PATENT OFFICE 2,038,278

MANUFACTURE OF METAL STOCK

Ralph F. Gibbs, Norton, Mass., assignor to The Improved Seamless Wire Company, Providence, R. I., a corporation of Rhode Island Application October 25, 1934, Serial No. 749,960

12 Claims. (Cl. 29—148)

My invention relates to the manufacture of specially shaped sheet or strip metal stock, available for many uses in the arts.

In carrying out my invention, I may operate upon various metals; metals of the ferrous type, alloys of various kinds, as well as precious and semi-precious metals, such as gold and silver. In particular, I have operated upon strip metal of the type familiarly known as "stainless steel", whose composition is more or less well known, preferring to employ that form of stainless steel which contains a small percentage of molybdenum.

The particular object of my invention is to provide thin strip metal, usually in relatively narrow widths, with a turned, folded, or curled edge (or a plurality of turned, folded, or curled edges) subsequently flattened so as to produce, lengthwise of such strip—which may be of any convenient length—a thickened edge wherein the displaced metal has been stressed beyond its elastic limit and is closely folded against and held in intimate and permanent contact with the main body of the metal strip operated upon.

A further object of my invention is to effect the production of rolled, and/or curled and subsequently flattened thickened edges at both sides of a strip of metal; such thickened edges being produced simultaneously and by a series of simultaneous steps.

And a still further object of my invention is to effect the production of relatively wider strips of metal with thickened edges simultaneously produced in a series of steps.

The several features of my invention are more fully pointed out hereinafter; reference being had to the accompanying drawings, more or less diagrammatic in character, in which:

Figure 1 is a fragmentary perspective view of a strip of metal, somewhat enlarged, in the form it presents preparatory to carrying out the operations forming the subject of my invention.

Fig. 2 is an end view of the metal strip shown in Fig. 1.

Fig. 3 is a fragmentary view of means which may be employed in carrying out the first step of the method forming the subject of my invention.

Fig. 4 is a fragmentary view of the same character as Fig. 3, illustrating means which may be employed in carrying out the second step of the method forming the subject of my invention.

Fig. 5 is a fragmentary view of the same character as Figs. 3 and 4, illustrating means which may be employed in carrying out the final step of the method forming the subject of my invention.

Figs. 3a, 4a, and 5a are end views of the metal strip after carrying out the first, second, and final steps in the operation of my improved method, respectively.

Fig. 3b is an end view of the metal strip showing a shape that may be imparted to the edge thereof between the first and second operations heretofore referred to.

Fig. 6 is a fragmentary perspective view of the final form of the metal strip following the operations carried out by the means illustrated in Figs. 3, 4, and 5.

Figs. 7, 8, and 9 are views similar to Figs. 3, 4, and 5, illustrating means which may be employed in turning, curling, or folding and flattening down both edges of the strip simultaneously.

Figs. 7a, 8a, and 9a are end views of the strip following the operations carried out by the means shown in Figs. 7, 8, and 9, respectively.

Fig. 7b is an end view of the metal strip showing a shape that may be imparted to the respective edges of the same between the operations effected by the means illustrated in Figs. 7, and 8, respectively.

Fig. 10 is an end view of a strip of double-width metal which may have both edges turned and flattened down simultaneously in accordance with the method forming the subject of my invention.

Figs. 11, 12, and 13 are end views illustrating successive stages of operations performed simultaneously upon a strip of double-width metal, involving a modification of the method forming the subject of my invention.

Fig. 14 is a fragmentary plan view of the double-width strip showing both side edges in the finished flattened condition.

Fig. 15 is a sectional view substantially on the line XV—XV, Fig. 3, illustrating a detail of the operation forming the subject of my invention, and Fig. 16 is a fragmentary view, greatly enlarged, of the finally folded, compressed, and thickened edge of the metal strip formed in accordance with my invention.

The behavior of metal undergoing rolling, or combined rolling and drawing, operations is a matter peculiar to the character of metal operated upon, and the manner of passing it through the rolls and/or dies. In carrying out my invention, I deform or upset the edge (or edges) of a thin strip of metal, having a thickness ranging from approximately .008" to approximately .015", to produce at such edge (or edges) thickened portions substantially double the thickness of the metal operated upon. This folding, or doubling of the edge (or edges) is carried out in a series of separate steps, although it is conceivable that it may be carried through as a continuous operation in a succession of stages.

The manner of operating upon the edge of the metal strip is in the nature of a combined rolling and drawing operation. The metal strip is passed between the rolls having the function of dies; such rolls being constructed and arranged to impart to the edge (or edges) of the metal strip the desired conformation as the latter is drawn between the same. In carrying out this operation, the metal strip is engaged by traction means, common in the art, and is drawn between the rolls simultaneously with the rotation of the latter; the combined operation producing the desired conformation at the edge (or edges) of the strip operated upon.

While many metals are available for use in carrying out my invention and in the production of the final product, I have successfully employed that particular form of ferrous metal known as "stainless steel"; and in particular have used the form of stainless steel containing a small quantity of molybdenum. This metal is hard, tough, and admirably adapted for many uses in the arts. The thickened edges have a particular purpose or function which will be pointed out hereinafter.

In Fig. 1 of the drawings, I have illustrated a fragment of a strip of metal, indicated at 10, at least one of whose edges is to be turned and folded down into intimate and permanent contact with the body thereof. This strip is of the same thickness throughout its extent, is rolled flat, and is usually coiled for convenience of subsequent use.

In carrying out my invention for the formation of a doubled, thickened edge at one side of this strip, I may employ means such as indicated in Fig. 3, comprising a pair of rolls A and B between which the strip 10 is passed, the roll A having an annular groove $a$ at one side face into which one edge of the strip will be crowded, and the roll B having flanges $b$ between which the roll A may fit; the annular groove at the side of the roll A being the exact thickness of the metal strip operated upon so that, when these rolls are in operative relation with respect to the interposed strip of metal and traction is applied to the latter, one edge, indicated at 11, will be turned into the recess formed by the annular groove $a$ at the bite of the rolls. The result of this work is to bend or stress the metal beyond its elastic limit and raise one edge of the metal in the form of a flange at substantially a right angle to the main portion of the strip; an end view of the strip after it has passed the rolls A and B being indicated at Fig. 3$^a$.

The second step in the production of the thickened edge consists in passing the flanged strip shown in Figs. 3 and 3$^a$ between a pair of rolls C and D, of the character shown in Fig. 4, with which rolls C and D side rolls E and F are associated; one of said latter rolls being of the Turk's-head type and having a rounded annular groove $e$ which engages the flange 11 at the edge of the strip of metal and curls or folds the same over and toward the body of the strip, as clearly illustrated at 11$^a$ in the drawings. In this set of rolls, the roll F serves to maintain the strip in proper position to insure that the curling, turning, or folding over of the flange 11 of the strip 10 will be properly accomplished. An end view of the strip of metal after it has passed the rolls C, D, E, and F is shown in Fig. 4$^a$.

The strip is now ready to have the folded or curled edge 11$^a$ flattened down against the body of the strip and into intimate and permanent contact therewith and, for this step in the method of operation, I preferably employ a pair of rolls of the type illustrated in Fig. 3; such rolls being illustrated at G and H in Fig. 5. In this arrangement, the roll G will have an annular groove $g$ at one side of its operative face, of a depth substantially the same as, or exactly the thickness of the metal turned over and the roll H will have flanges $h$ between which the roll G operates; such flanges serving to maintain the metal strip in proper position laterally and insure that the turned edge will be flattened down into intimate and permanent contact with the main body of the metal strip, as indicated at 11$^b$. An end view of the strip of metal after it has passed the rolls G and H is illustrated in Fig. 5$^a$, and a fragmentary perspective view of the same is shown in Fig. 6. In this condition of the thickened edge, the turned over and flattened down portion has been substantially roll-forged and permanently stressed beyond the elastic limit of the metal.

The thickened edge may have its outer side or face in a plane substantially normal to the plane of the metal strip, with rounded corners at 11$^c$ and 11$^d$, as indicated in Fig. 16. The extent of this rounding may depend in some measure upon the pressure exerted by the grooved portion $g$ of the roll G against the roll H and the position the metal strip occupies at the bite of the rolls. If the outer side or face of the thickened edge is more or less rounded, it may facilitate further treatment in some of the uses to which the metal strip having such permanently thickened edge is put.

While I have described in the foregoing and have illustrated means for effecting in three steps or stages of operation the desired flanging, curling, or turning, and subsequent flattening down of an edge of the metal strip, it may be necessary or desirable to impart an intermediate operation to the flanged edge of the metal strip between the operations effected by the means illustrated in Figs. 3 and 4. In Fig. 3$^b$, I have shown the flange 11 of the metal strip illustrated in Fig. 3$^a$ slightly bent inwardly in a diagonal direction, as indicated at 11$^\times$, such condition, if necessary, facilitating passage of the metal strip between the rolls C, D, E, and F, wherein the groove $e$ of the roll E effects the complete turning or curling of the flanged portion in preparation for the final step of flattening down such turned or curled edge.

While it is possible to roll a single thickened edge upon a narrow strip of metal with precision and relative economy, it happens that the act or the succession of acts or steps in the production of this single thickened edge tends to produce strains or stresses in some forms of metal than can not be compensated for; resulting in the production of a strip with a wavy edge opposite the thickened edge and, additionally, destroying the flat condition of the original strip; a defect that may be of consequence in the subsequent use of the metal strip with the thickened edge. This condition is particularly noticeable in the operation of rolling and/or drawing stainless steel of the "moly" type.

In carrying out the production of a thickened edge upon thin strip metal, it is desirable to have such metal remain in the original flattened state, and I have found that by turning both edges simultaneously by suitable rolls of the general character illustrated in Figs. 3, 4 and 5, but modified to the extent illustrated in Figs. 7, 8, and 9, the stress or strains progressively set up in the flanging, folding, and flattening of a single edge of this thin strip metal in a series of steps in the manner proposed, are compensated for, and that, when such duplex folding, so to speak, is completed, the strip with each edge folded against the main body thereof will have such main body of the metal between such folded edges in the original flat condition.

In the arrangement illustrated in Figs. 7, 8, and 9, the roll A' will have both of its side faces recessed at $a'$ so that, when in association with the roll B' having flanges $b'$, both edges of the strip of metal will be crowded into the spaces defined by the recesses $a'$. An edge view of the metal strip from this first stage of the operation; the flanges being indicated at 11, is illustrated in Fig. 7ª. From this stage of the operation, the metal strip with the flanged edges passes to the series of rolls C', D', E', and E², illustrated in Fig. 8; the rolls E' and E² being rolls of the Turk's-head type having the semicircular annular grooves $e'$ and $e^2$ which effect the folding or curling of the flanges 11 produced by passage between the rolls A' and B'. An end view of the metal strip following this operation— the folded or curled edges being indicated at 11ᵃᵃ— is illustrated in Fig. 8ª.

Fig. 9 shows a pair of rolls G' and H' of substantially the same type as those illustrated in Fig. 5, excepting that the roll G' will have its face annularly recessed at both edges of the same, as indicated at $g'$, so as to finally bend over and flatten down against the main body of the metal strip, the turned or curled edges 11ᵃᵃ produced by passage between the rolls C', D', E', and E². An end view of the metal shown in Fig. 9—the flattened portions being indicated at 11ᵇᵇ—is illustrated in Fig. 9ª.

While I have described in the foregoing and have illustrated means for effecting in three steps or stages of operation the desired flanging, curling, or turning, and subsequent flattening down of both edges of the metal strip simultaneously, it may be necessary or desirable to impart an intermediate operation to the flanged edges of the metal strip between the operations effected by the means illustrated in Figs. 7 and 8. In Fig. 7ᵇ, I have shown the flanges 11 of the metal strip illustrated in Fig. 7ª, slightly bent inwardly in a diagonal direction, as indicated at 11ˣˣ, such condition, if necessary facilitating passage of the metal strip between the rolls C', D', E', and E², wherein the grooves $e'$ and $e^2$ of the rolls E' and E² effect the complete turning or curling of the flanged portions 11 in preparation for the final step of flattening down such turned curled edges.

While the metal produced in the manner illustrated and described in the foregoing is applicable for many uses in the arts, it has particular advantages in the manufacture of pens; pens made from a special metal strip of such type being described and claimed in the application of Leon Hehl Ashmore, filed July 27, 1934, Serial No. 737,307.

With stock of the character made in accordance with the method of manufacture illustrated and described with respect to Figs. 3, 4, and 5, pens blanked therefrom will face in one direction, the thickened end of the stock forming the writing tip point of the pen. In the use of stock of the character formed in accordance with the means illustrated in Figs. 7, 8, and 9, and described in relation thereto, the pens may be blanked in either direction; either thickened edge serving as the thickened portion at the writing tip point of the pen.

It may very well be that certain limitations in the rolling operation will prevent, by reason of the strains and stresses due to the rolling operation, the use of a strip greater in width than one permitting the blanking of single pens transversely of the same. On the other hand, it is possible that wider strips might be employed from which a plurality of pens might be blanked transversely of the same if, in the rolling operation, compensation is made for the strains and stresses that might be produced. To this end, I have illustrated, in Figs. 10, 11, 12, 13, and 14 a strip of metal, indicated at 100, of substantially double the width of that illustrated in the other views, in which there is produced, simultaneously with the steps necessary to turn over and flatten down each side edge of the same, a central rib or projection 12 continuously formed, which rib progressively increases in depth contemporaneously with the draft of the metal through the respective sets of rolls; the deformation of the metal strip at this central point relieving the stresses and strains incident to the rolling and/or drawing operation. In Fig. 11, for instance, the rib is substantially the depth of the flanges 110 produced by the first pass. In Fig. 12, the rib 12 is materially deeper, and is applied during the curling or folding over of the flanges, as indicated at 110ª, and in Fig. 13, the central rib 12 is materially deepened for relieving those stresses which might be occasioned by the flattening down of the turned edges, indicated at 110ᵇ.

The improved method forming the subject of my invention has been applied to the production of thickened edges upon a strip of stainless steel, a material particularly available for the manufacture of pens with a thickened portion at the writing tip end of the same; such, for instance, as that described in the Ashmore application before referred to. It will be understood, however, that I do not wish to be limited to the use of stainless steel in carrying out the method forming the subject of my invention, and that such method, in all of its details, may be employed in forming thickened edges upon strips of various types of metals, whether or not available for use in the manufacturing of writing pens.

In view of the nature of many metals operated upon, it is highly essential that the strip be guided in exact parallelism to the respective rolls for turning or flanging, curling or folding and finally flattening down the turned or flanged edge, and I have found it desirable to feed the strip to the rolls from a point below the same, in the manner indicated in Fig. 15, wherein it will be noted that the strip is directed to the rolls A and B, from a point below the same, so that the flanges $b$ of the roll B, for instance, may have contact with the edges of the metal strip to a greater extent than if such strip was fed to such rolls horizontally, or as indicated by the dotted line $z$.

I have shown in Figs. 3ᵇ and 7ᵇ views indicating a shape which has been termed intermediate between the shapes illustrated in Figs. 3ª and 4ª, and 7ª and 8ª. When the shapes illustrated in Figs. 3ᵇ and 7ᵇ have been made it may be possible to eliminate the step producing the shape shown in Figs. 4a and 8a, and the metal formed in the shape illustrated in Fig. 3b or 7b may proceed directly to the flattening operation; the result of which is illustrated in Figs. 5a and 9a.

Reference has been made in the specification to a method of preparing this stock with a thickened edge by a combined rolling and drawing operation to produce a substantially roll-forged, flattened-down portion. There may be metals and there may be times when a rolling operation alone will be sufficient to effect the desired deformation of the metal edge or edges and the final flattening thereof, and there may be times when a drawing operation alone will effect the same result. It will be understood therefore that my claims are to be understood as covering a drawing operation, a rolling operation, and combined rolling and drawing operations.

While I have described with some particularity one method of forming a thickened edge (or edges) upon a metal strip, it will be understood that I do not wish to be limited to the exact details thereof, and that modifications may be made in such method within the scope of the appended claims, without departing from my invention.

I claim:—

1. In the manufacture of metal stock for forming pen points and the like, the steps of first bending an edge portion of a strip of thin metal to form a flange overlying the main body of the strip and finally drawing and roll-forging said flange into intimate and permanent contact with the main body of the strip, whereby a thickened edge of narrow width is obtained.

2. In the manufacture of metal stock for forming pen points and the like, the steps of first bending an edge portion of a strip of thin alloy steel to form a flange overlying the main body of the strip and finally drawing and roll-forging said flange into intimate and permanent contact with the main body of the strip, whereby a thickened edge of narrow width is obtained.

3. In the manufacture of metal stock for forming pen points and the like, the steps of first bending an edge portion of a strip of thin stainless steel to form a flange overlying the main body of the strip and finally drawing and roll-forging said flange into intimate and permanent contact with the main body of the strip, whereby a thickened edge of narrow width is obtained.

4. In the manufacture of metal stock for forming pen points and the like, the steps of first bending an edge portion of a strip of thin metal to form a flange, curling or folding said flange against the main body of the strip and finally drawing and roll-forging said flange into intimate and permanent contact with the main body of the strip, whereby a thickened edge of narrow width is obtained.

5. In the manufacture of metal stock for forming pen points and the like, the steps of first bending an edge portion of a strip of thin alloy steel to form a flange, curling or folding said flange against the main body of the strip and finally drawing and roll-forging said flange into intimate and permanent contact with the main body of the strip, whereby a thickened edge of narrow width is obtained.

6. In the manufacture of metal stock for forming pen points and the like, the steps of first bending an edge portion of a strip of thin stainless steel to form a flange, curling or folding said flange against the main body of the strip and finally drawing and roll-forging said flange into intimate and permanent contact with the main body of the strip, whereby a thickened edge of narrow width is obtained.

7. Metal stock for forming pen points and the like, consisting of a strip of thin metal having one edge turned over and drawn and substantially roll-forged down against the body of the strip in intimate and permanent contact therewith, forming a thickened edge of narrow width.

8. Metal stock forming pen points and the like, consisting of a strip of thin alloy steel having one edge turned over and drawn and substantially roll-forged down against the body of the strip in intimate and permanent contact therewith, forming a thickened edge of narrow width.

9. Metal stock for forming pen points and the like, consisting of a strip of stainless steel having one edge turned over and drawn and substantially roll-forged down against the body of the strip in intimate and permanent contact therewith, forming a thickened edge of narrow width.

10. Metal stock for forming pen points and the like, consisting of a strip of thin metal having its edges turned over and drawn and substantially roll-forged down against the body of the strip in intimate and permanent contact therewith, forming a thickened edge of narrow width.

11. Metal stock for forming pen points and the like, consisting of a strip of thin alloy steel having its edges turned over and drawn and substantially roll-forged down against the body of the strip in intimate and permanent contact therewith, forming a thickened edge of narrow width.

12. Metal stock for forming pen points and the like, consisting of a strip of thin stainless steel having its edges turned over and drawn and substantially roll-forged down against the body of the strip in intimate and permanent contact therewith, forming a thickened edge of narrow width.

RALPH F. GIBBS.